US012777510B2

(12) United States Patent
Takizawa

(10) Patent No.: US 12,777,510 B2
(45) Date of Patent: Oct. 27, 2026

(54) NON-REGENERATIVE RELAY CONTROL METHOD, INFORMATION PROCESSING APPARATUS, AND COMMUNICATION SYSTEM

(71) Applicant: TOYOTA JIDOSHA KABUSHIKI KAISHA, Toyota (JP)

(72) Inventor: Kenichi Takizawa, Koganei (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 392 days.

(21) Appl. No.: 18/499,807

(22) Filed: Nov. 1, 2023

(65) Prior Publication Data

US 2024/0147511 A1 May 2, 2024

(30) Foreign Application Priority Data

Nov. 2, 2022 (JP) ................................ 2022-176756

(51) Int. Cl.
*H04W 72/541* (2023.01)
*H04W 72/02* (2009.01)
*H04W 88/04* (2009.01)

(52) U.S. Cl.
CPC ......... *H04W 72/541* (2023.01); *H04W 72/02* (2013.01); *H04W 88/04* (2013.01)

(58) Field of Classification Search
CPC ... H04W 72/541; H04W 72/02; H04W 88/04; H04W 72/0453; H04W 40/22; H04W 72/0446; H04L 5/0073; H04B 7/15542; H04B 7/15507
See application file for complete search history.

(56) References Cited

U.S. PATENT DOCUMENTS 8,335,466 B2 * 12/2012 Cai ....................... H04W 72/23 455/434
12,063,173 B2 * 8/2024 Xiong .................. H04L 5/0051
(Continued)

OTHER PUBLICATIONS

3rd Generation Partnership Project, "3GPP TS 138.174 V17.0.0", dated Apr. 2022, 333 pgs.
(Continued)

*Primary Examiner* — Will W Lin
(74) *Attorney, Agent, or Firm* — Finnegan, Henderson, Farabow, Garrett and Dunner, LLP

(57) ABSTRACT

In a communication system that a relay station non-regeneratively relays a signal from a transmitting station to a first receiving station, when the relay station performs non-regenerative relay using a first resource block that is assigned to the relay station and the first receiving station for the non-regenerative relay and a second resource block that uses a baseband signal obtained by inverting the frequencies of a baseband signal relating to the first resource block, an information processing apparatus determines, based on information indicating a reception signal strength of a signal received by the relay station from a second receiving station other than the first receiving station, whether or not interference with the second receiving station is allowable, and assigns the second resource block to the relay station and the first receiving station as an additional resource block for the non-regenerative relay when the determining that the interference is allowable.

20 Claims, 12 Drawing Sheets

(56) References Cited

U.S. PATENT DOCUMENTS

| | | | | |
|---|---|---|---|---|
| 2006/0019661 | A1* | 1/2006 | Tanoue | H04W 64/00 455/435.2 |
| 2008/0207117 | A1* | 8/2008 | Lim | H04B 7/15557 455/9 |
| 2010/0304665 | A1* | 12/2010 | Higuchi | H04B 7/2606 455/7 |
| 2012/0083202 | A1* | 4/2012 | Sawamoto | H04B 7/15535 455/7 |
| 2012/0230249 | A1* | 9/2012 | Fukumoto | H04W 52/46 370/315 |
| 2013/0028169 | A1* | 1/2013 | Bontu | H04B 7/15542 370/315 |
| 2013/0083722 | A1* | 4/2013 | Bhargava | H04W 52/245 455/10 |
| 2014/0206374 | A1* | 7/2014 | Luo | H04W 72/52 455/452.1 |
| 2019/0132804 | A1* | 5/2019 | Hong | H04W 52/46 |
| 2020/0015168 | A1* | 1/2020 | Kamei | H04W 52/0245 |
| 2020/0383171 | A1* | 12/2020 | Kiyohara | H04W 24/08 |
| 2021/0044347 | A1* | 2/2021 | Dussmann | H04B 7/15507 |
| 2025/0088261 | A1* | 3/2025 | Sharma | H04B 7/15557 |

OTHER PUBLICATIONS

3rd Generation Partnership Project, "3GPP TS 138.106 V17.0.0", dated Apr. 2022, 72 pgs.

* cited by examiner

NON-REGENERATIVE RELAY CONTROL METHOD, INFORMATION PROCESSING APPARATUS, AND COMMUNICATION SYSTEM

CROSS REFERENCE TO THE RELATED APPLICATION

This application claims the benefits of Japanese Patent Application No. 2022-176756, filed on Nov. 2, 2022, which is hereby incorporated by reference herein in its entirety.

BACKGROUND

1. Technical Field

The present disclosure relates to a non-regenerative relay control method, an information processing apparatus, and a communication system.

2. Description of the Related Art

In wireless communication using a 5th Generation Mobile Communication System (5G) or the like, communication with an ultra-low latency of sub-milliseconds or less is expected. From the viewpoint of improving communication services, meanwhile, it is desirable to expand the coverage area of a cell, and to achieve this, relay communication through a relay station is effective. Accordingly, wireless communication methods in which a terminal station that performs wireless communication is used as a relay station have been proposed. Furthermore, non-regenerative relay, in which demodulation and decoding are not performed in the relay station, is attractive as a low-latency relay technique. For further information, see For further information, see “3GPP TS 38.174 V17.0.0(2022-03)” and “3GPP TS 38.106 V17.0.0(2022-03)”.

SUMMARY

An object of the present disclosure is to provide a non-regenerative relay control method, an information processing apparatus, and a communication system with which frequency diversity gain can be obtained in a receiving station.

One aspect of the present disclosure is a method of controlling non-regenerative relay in a communication system in which a relay station non-regeneratively relays a signal from a transmitting station to a first receiving station, the method comprising: in a case where the relay station performs the non-regenerative relay using a first resource block that is assigned to the relay station and the first receiving station for the non-regenerative relay and a second resource block that uses a baseband signal obtained by inverting the frequencies of a baseband signal relating to the first resource block, determining, by an information processing apparatus, which is made based on information indicating a reception signal strength of a signal received by the relay station from a second receiving station other than the first receiving station, as to whether or not interference with the second receiving station is allowable; and assigning, by the information processing apparatus, the second resource block to the relay station and the first receiving station as an additional resource block for the non-regenerative relay when it is determined that the interference is allowable.

Another aspect of the present disclosure is an information processing apparatus that controls non-regenerative relay in a communication system in which a relay station non-regeneratively relays a signal from a transmitting station to a first receiving station. The information processing apparatus includes a controller that executes; in a case where the relay station performs the non-regenerative relay using a first resource block that is assigned to the relay station and the first receiving station for the non-regenerative relay and a second resource block that uses a baseband signal obtained by inverting the frequencies of a baseband signal relating to the first resource block, determining, which is made based on information indicating a reception signal strength of a signal received by the relay station from a second receiving station that differs from the first receiving station, as to whether or not interference with the second receiving station is allowable; and assigning the second resource block to the relay station and the first receiving station as an additional resource block for the non-regenerative relay when it is determined that the interference is allowable.

A further aspect of the present disclosure is a communication system including a relay station that non-regeneratively relays a signal from a transmitting station to a first receiving station, and an information processing apparatus that executes, in a case where the relay station performs the non-regenerative relay using a first resource block that is assigned to the relay station and the first receiving station for the non-regenerative relay and a second resource block that uses a baseband signal obtained by inverting the frequencies of a baseband signal relating to the first resource block, a determination, which is made based on information indicating a reception signal strength of a signal received by the relay station from a second receiving station that differs from the first receiving station, as to whether or not interference with the second receiving station is allowable, and assigns the second resource block to the relay station and the first receiving station as an additional resource block for the non-regenerative relay when the determining that the interference is allowable.

The present disclosure may include a program having similar characteristics to the non-regenerative relay control method described above, a temporary storage medium storing the program, a relay station, and so on.

According to the present disclosure, it is possible to obtain frequency diversity gain in a receiving station that receives a non-regenerative relay signal.

DESCRIPTION OF THE EMBODIMENTS

A communication system in which a signal transmitted from a transmitting station (e.g., a base station) is received by a relay station and non-regeneratively relayed to a first receiving station (e.g., a terminal station) is available. The SINR (Signal to Interference plus Noise Ratio) during the non-regenerative relay is determined by the communication section with the greatest attenuation. Between the relay station and the terminal station in particular, it is impossible to increase the gains of the antennae provided in the stations, and therefore maintaining the line quality is problematic.

In a non-regenerative relay control method according to the present disclosure, an information processing apparatus for controlling non-regenerative relay executes, in a case where a relay station performs the non-regenerative relay using a first resource block that is assigned to the relay station and a first receiving station for the non-regenerative relay and a second resource block that uses a baseband signal obtained by inverting the frequencies of a baseband signal relating to the first resource block, a determination, which is made based on information indicating a reception signal strength of a signal received by the relay station from a second receiving station that differs from the first receiving station, as to whether or not interference with the second receiving station is allowable, and after determining that the interference is allowable, assigns the second resource block to the relay station and the first receiving station as an additional resource block for the non-regenerative relay.

By adding (appending) the second resource block to the non-regenerative relay, frequency diversity gain can be obtained in the first receiving station, and as a result, a favorable line quality can be obtained in relation to the first receiving station.

A non-regenerative relay control method, an information processing apparatus, and a communication system according to an embodiment will be described below based on the figures. The configurations of the embodiment described below are provided as examples, and the present disclosure is not limited to the configurations of this embodiment. Note that in the embodiment, a 5G communication system is described as an example of the communication system, but the configurations of the transmitting station, relay station, and receiving stations according to the present disclosure may also be applied to a communication system (6G, a wireless LAN or the like) other than 5G.

Figure 1:
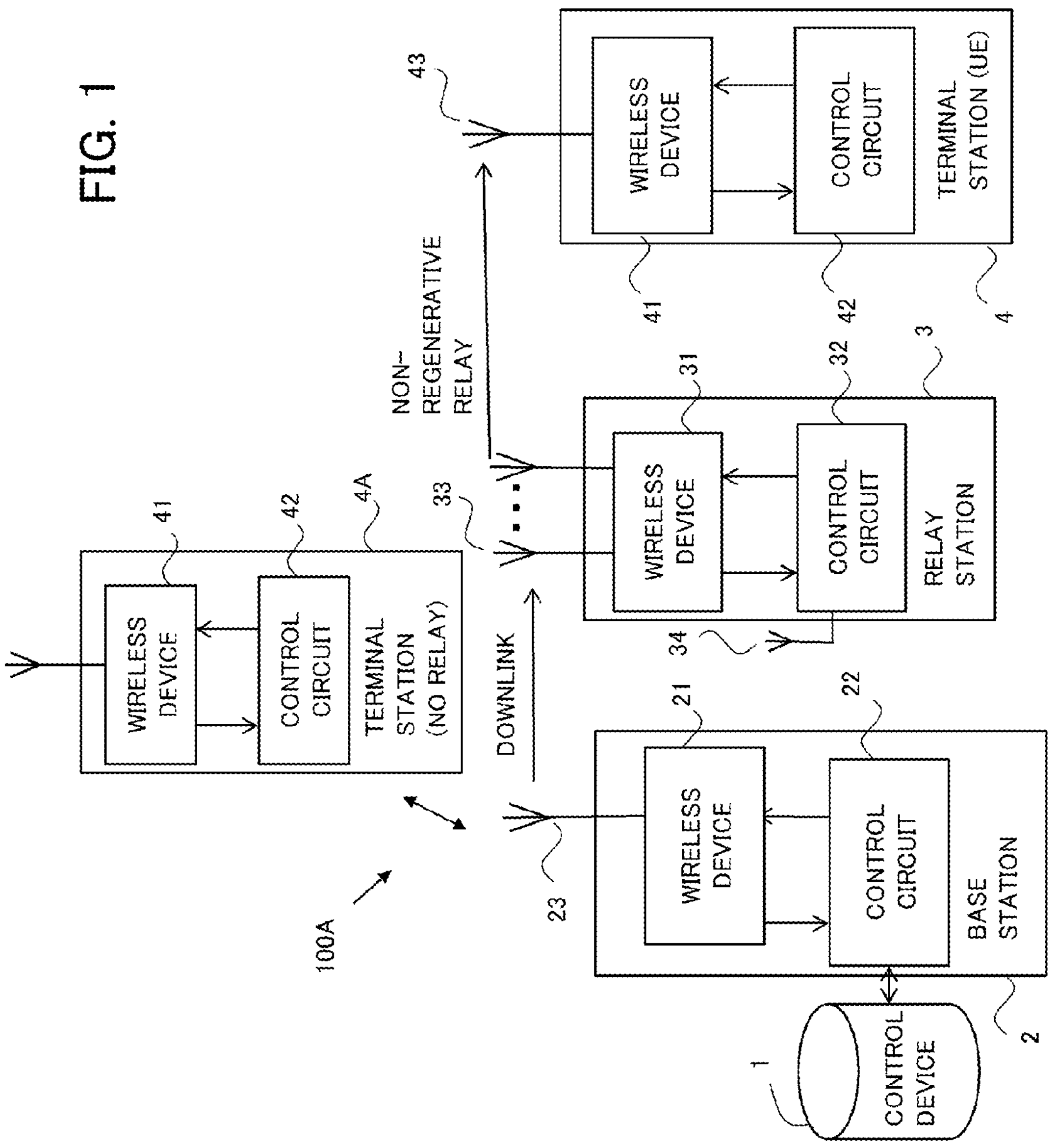
FIG. 1 is a view showing a first example configuration of a communication system according to an embodiment.

FIG. 1 is a view showing a first example configuration of the communication system. In FIG. 1, a communication system 100A according to the first example configuration includes a control device 1, a base station 2, a relay station 3, a terminal station 4 serving as the relay destination of a non-regenerative relay, and a terminal station 4A other than the terminal station 4. The terminal station 4A is a terminal that communicates directly with the base station 2, and the number of terminal stations 4A may be singular or plural.

The control device 1 is a device disposed on a network (a core network, for example) to which the base station 2 is connected. Note, however, that the control device 1 may also be thought of as the core network itself or as a system included in the core network. The core network includes an optical fiber network, for example. The control device 1 controls the base station 2, the relay station 3, the terminal station 4, and the terminal station 4A, and provides communication services to the terminal station 4 and the terminal station 4A.

The base station 2 provides the terminal stations 4 and 4A with a wireless access network. An area in which wireless communication can be performed on the wireless access network is also known as a cell. In this embodiment, the base station 2 includes one, two, or more antennae (FIG. 1, shows an example in which one antenna is provided), a transceiver 21 corresponding to the antenna, and a control circuit 22. The control circuit 22 includes a processor and a memory, for example. The processor controls communication with the control device 1 (the base station 2) and wireless communication with the relay station 3 and the terminal stations 4 and 4A by executing a computer program stored in the memory.

The relay station 3 relays wireless communication (performs non-regenerative relay) between the base station 2 and the terminal station 4. The relay station 3 is a small base station, a mobile base station, an in-vehicle device, a smartphone, or the like, for example. The relay station 3 can be selected as a relay station by the control device 1 from among devices configured to be capable of non-regenerative relay. When a connection request is issued by the terminal station 4, the control device 1 can select one or more relay stations 3 located within the range of the cell provided by the base station 2 and transmit an instruction for non-regenerative relay of a wireless communication to each relay station 3. The relay stations 3 that receive the instruction then operate as the relay station 3 selected by the control device 1.

The relay station 3, similarly to the base station 2, includes one, two, or more antennae 33 (FIG. 1 shows an example in which a plurality of antennae 33 are provided), a wireless device (radio) 31 corresponding to the antenna 33, and a control circuit 32 (an example of a "controller (control unit)"). The control circuit 32 of the relay station 3 receives control-related information and may therefore include an antenna 34 that is independent of the relay line (the antennae 33).

The terminal station 4 is a mobile station such as a smartphone, a tablet terminal, a wearable terminal, or a data communication device installed in a vehicle, for example. The terminal station 4 is not limited thereto, however, and may also be a stationary terminal device. For example, the terminal device connects to the wireless access network within the range of the cell provided by the base station 2.

The terminal station 4 includes one, two, or more antennae 43 (FIG. 1 shows an example in which one antenna 43 is provided) used to receive wireless signals, a transceiver 41 connected to the antenna, and a control circuit 42. For example, when a mobile station in the cell issues a request to the base station 2 to connect to the wireless access network and is connected thereto, the mobile station operates as the terminal station 4. The mobile station in the cell may issue the request to connect to the wireless access network directly to the base station 2. Alternatively, the mobile station in the cell may issue the request to connect to the wireless access network to the base station 2 through the device operating as the relay station 3 in the cell. The terminal station 4 can be considered as a station that is capable of communicating with the base station 2 either through one of the one or more relay stations 3 or without passing through any of the one or more relay stations 3.

The terminal station 4A has a similar configuration to the terminal station 4. However, the terminal station 4A differs from the terminal station 4 in that the terminal station 4A communicates directly with the base station 2, without passing through the relay station 3.

Figure 2:
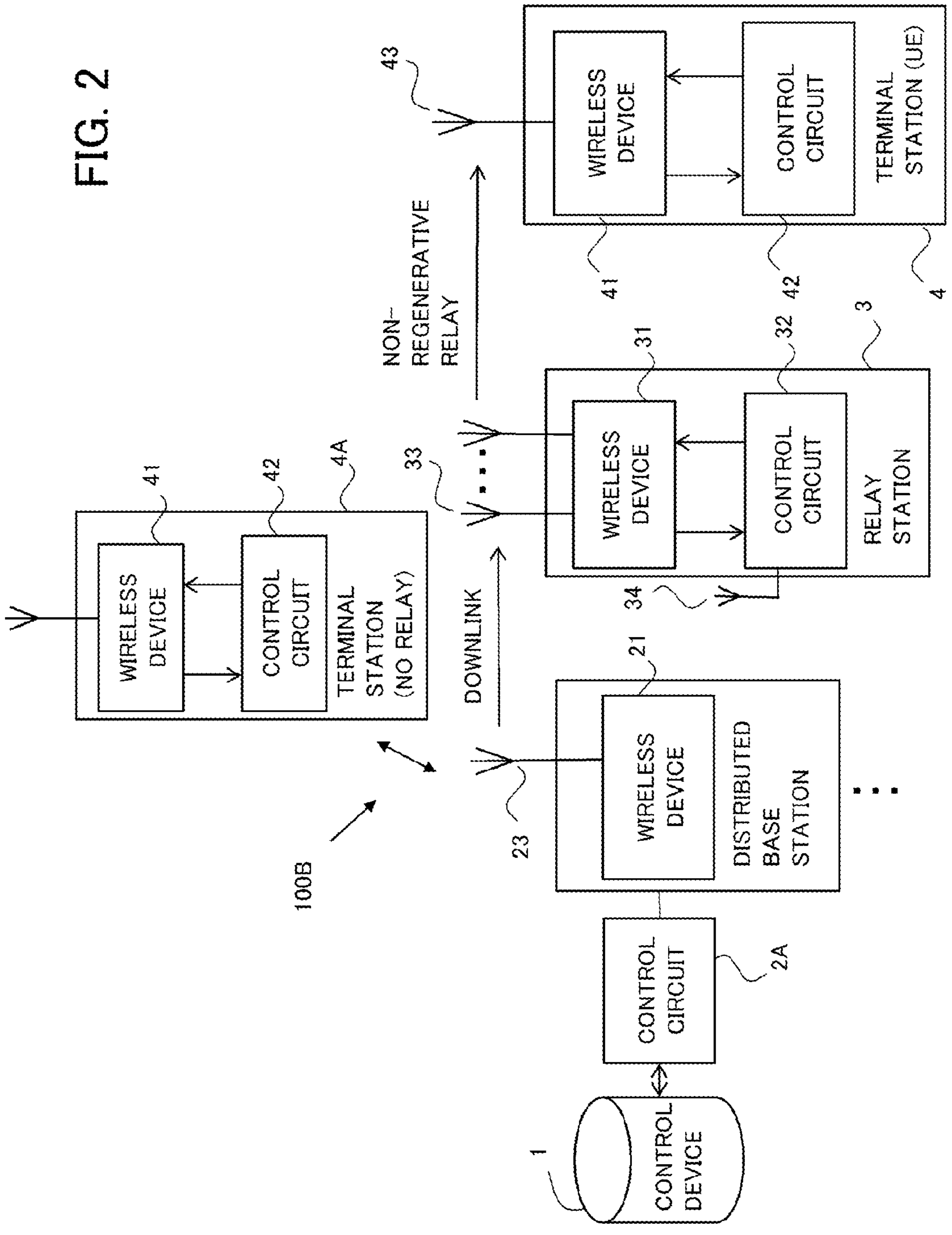
FIG. 2 is a view showing a second example configuration of the communication system according to this embodiment.

FIG. 2 is a view illustrating a second example configuration of the communication system. A communication system 100B pertaining to the second example configuration shown in FIG. 2 may be applied as the communication system. The communication system 100B differs from the communication system 100A of FIG. 1 in the following respect. Specifically, the base station of the communication system 100B includes a control circuit 2A and one or more distributed base stations 2B.

The control circuit 2A corresponds to the control circuit 22 of the communication system 100, and controls operations of the respective distributed base stations 2B. Each distributed base station 2B includes a transceiver 21 corresponding to the antenna 23. The control circuit 2A and the transceivers 21 of the distributed base stations 2B are connected by an optical fiber or wireless network, for example. The topology of the optical fiber connecting the control circuit 2A and the distributed base stations 2B is not limited to a specific topology. For example, the optical fiber topology may be a one-to-one connection between nodes, a network that branches with increasing distance from the control circuit 2A, a star-shaped network, a ring network, or the like. Further, when the control circuit 2A and the transceivers 21B of the distributed base stations 2B are connected by a wireless network, the standards and protocol of the employed wireless network are not limited to specific standards or a specific protocol.

Similarly to the control circuit 22 of FIG. 1, the control circuit 2A includes a processor and a memory. The processor controls communication with the control device 1 and wireless communication with the relay station 3 and the terminal stations 4 and 4A by executing a computer program stored in the memory. In other words, the control circuit 2A controls wireless communication with the relay station 3 and the terminal stations 4 and 4A through the transceivers 21B of the distributed base stations 2B. The configurations of the relay station 3 and the terminal stations 4 and 4A are the same as those of the communication system 100A, and therefore duplicate description thereof has been omitted.

The communication systems 100A and 100B are 5G networks, and the following configurations are employed therein as prerequisites. The basic communication unit is a "frame" of 10 milliseconds, which is divided into "subframes" with a length of 1 millisecond, for example. Each subframe is further divided into "slots" of 0.5 milliseconds, and each slot is divided into 14 "symbol" units. A cyclic prefix (CP) is inserted between the symbols. For example, 1 slot=14 symbols×12 (180 KHz) subcarriers is defined as a resource block (RB), and the resource block serves as the basic unit of communication. In a 5G network, orthogonal frequency-division multiplexing (OFDM) is applied as a digital modulation method for baseband signals, and a baseband signal can be carried on the subcarriers forming the resource block by digital modulation.

Each of the resource blocks that are used by the terminal station 4 and the terminal station 4A for uplink and downlink communication is assigned to the terminal station 4 and the terminal station 4A by the control device 1 or the control circuit 22 (the control circuit 2A) of the base station 2. The resource blocks used for non-regenerative relay are likewise assigned to the relay station 3 and the terminal station 4 by the control device 1 or the control circuit 22 (the control circuit 2A) of the base station 2.

In the communication systems 100A and 100B, communication is performed by time division multiplexing so that the same frequency channel is used on the uplink and the downlink. Further, the start timings of the respective slots constituting the wireless frames are synchronized between the base station 2, the relay station 3, and the terminal stations 4 and 4A.

In the communication systems 100A and 100B, a block transmission method having a cyclic prefix (CP), such as CP-OFDM (Cyclic Prefix—Orthogonal Frequency Division Multiplexing), is used as a wireless modulation method. In this embodiment, a case in which CP-OFDM is applied will be described, but a block transmission method having a CP other than CP-OFDM may be used. Furthermore, the relay station 3 shares the resource block information used by the terminal station 4 serving as the relay subject on the uplink and the downlink.

Note that the uplink is a link directed from the terminal station 4 to the base station 2. The downlink is a link directed from the base station 2 to the terminal station 4. In the following description, a case in which non-regenerative relay is performed on the downlink will be described as an example. In other words, the base station 2 and the distributed base stations 2B each correspond to a "transmitting station", and the terminal station 4 corresponds to a "first receiving station". Further, the terminal station 4A corresponds to a "second receiving station". Furthermore, the control device 1 and the control circuits 22 and 2A of the base station 2 are examples of an "information processing apparatus". Note that in this embodiment, the non-regenerative relay performed by the relay station 3 may also be applied to uplink communication. In the following description, the communication system 100A will be described as an example of a communication system.

Figure 3:
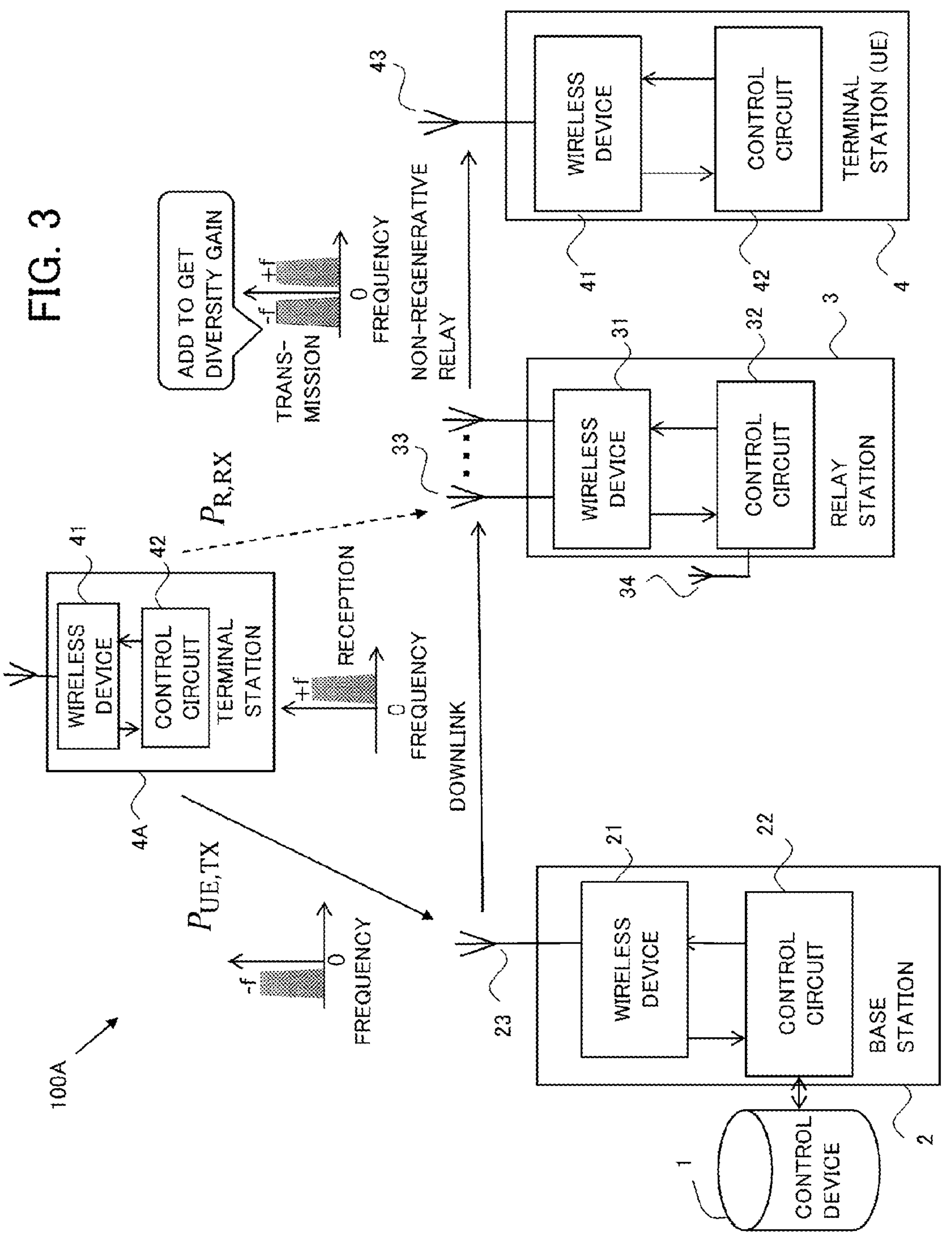
FIG. 3 is a view illustrating a first non-regenerative relay control method.

FIG. 3 is a view illustrating a first non-regenerative relay control method. FIG. 3 shows the communication system 100A. The control circuit 22 of the base station 2 or the control device 1 assigns resource blocks to the terminal stations 4 and 4A. In the following description, an example in which the control circuit 22 of the base station 2 assigns the resource blocks will be described as an example.

The control circuit 22 of the base station 2 assigns a resource block (referred to as a first resource block) for downlink non-regenerative relay to the relay station 3 and the terminal station 4. Several frequencies in the positive region are assigned as frequencies of the baseband signal (center frequency 0; referred to as the "baseband signal relating to the resource block") carried on the bundle of subcarriers forming the first resource block. In FIG. 3, the frequencies of the baseband signal carried on the bundle of subcarriers assigned to the terminal station 4 are shown schematically as a "+f" block.

Meanwhile, the frequencies of the baseband signal carried on the bundle of subcarriers forming a resource block (referred to as a second resource block) assigned to communication with the terminal station 4A when the base station 2 communicates with the terminal station 4A on the downlink are frequencies obtained by inverting the "+f" frequencies described above from positive to negative (shown schematically in FIG. 3 as a "−f" block). The "+f" block and the "−f" block are in line symmetry about the center frequency 0.

Here, if the relay station 3 transmits a downlink signal (a non-regenerative relay signal) using the second resource block to the terminal station 4A at the timing at which the base station 2 performs transmission to the terminal station 4A on the downlink using the second resource block, this signal interferes with the signal transmitted from the base station 2 to the terminal station 4A. In certain cases, however, the reception signal strength (the coupling state) of the non-regenerative relay signal transmitted from the relay station 3 may indicate that downlink signal reception in the terminal station 4A will not be greatly affected thereby (i.e., that the interference may be allowable). In this case, the second resource block does not affect downlink communication with the terminal station 4A even when added to the first resource block as an additional resource block during the non-regenerative relay and used in the non-regenerative relay. In this embodiment, the control circuit 22 (the control circuit 2A) of the base station 2 or the control device 1 determines whether or not the second resource block can be assigned to non-regenerative relay between the relay station 3 and the terminal station 4 (in other words, whether or not the interference with the terminal station 4A is allowable), and when it is determined that the interference is allowable, the second resource block is assigned to the non-regenerative relay between the relay station 3 and the terminal station 4. Accordingly, the relay station 3 transmits a non-regenerative relay signal to the terminal station 4 using the first resource block and the second resource block. When the terminal station 4 receives this signal, the diversity gain in the terminal station 4 can be improved, and as a result, the quality of the non-regenerative relay signal (the downlink) can be maintained or improved.

More specifically, the following operation or processing is performed. The base station 2 (the control circuit 22 or the control device 1) notifies the relay station 3 of the timing at which the terminal station 4A, which uses a resource block (the second resource block) having frequencies with the opposite sign ("−f" in FIG. 3) in the baseband signal to the subcarriers used by the resource block (the first resource block) assigned to non-regenerative relay, will transmit a signal on the uplink. Further, the base station 2 instructs the relay station 3 to measure the reception signal strength in the relay station 3 of the signal transmitted using the second resource block at the notified timing.

The relay station 3 measures the reception signal strength P_(R, RX) on the notified uplink resource block, and reports the measured reception signal strength P_(R, RX) to the base station 2 through a control line.

The base station 2 calculates a propagation loss L_(UE→R) between the terminal station 4 and the relay station 3 from the reported reception signal strength P_(R, RX) and an instructed value P_(UE, TX) of the power transmitted to the terminal station 4. When the propagation loss L_(UE→R) equals or exceeds a threshold Δ_L, the relay station 3 and the terminal station 4 serving as the relay destination are notified of the second resource block as an appended resource block (an additional resource block).

The following equation, for example, can be used to calculate the threshold Δ_L for the propagation loss L_(UE→R).

$$\Delta\_L=P\_(R,\max)-(W\_UE+\Gamma\_UE(MCS))+\delta \qquad \text{Equation:}$$

Here, P_(R, max) is the maximum transmission power allowed by the relay station. W_UE is the noise level of the terminal station 4A. Γ_UE(MCS) is the desired SINR of the MCS (Modulation and Coding Scheme) pertaining to the downlink between the base station 2 and the terminal station 4A (an example of a value indicating the desired quality of the downlink). Further, δ is a margin, which is normally set at 6 dB. Note, however, that the value of the margin can be set as appropriate.

Figure 4:
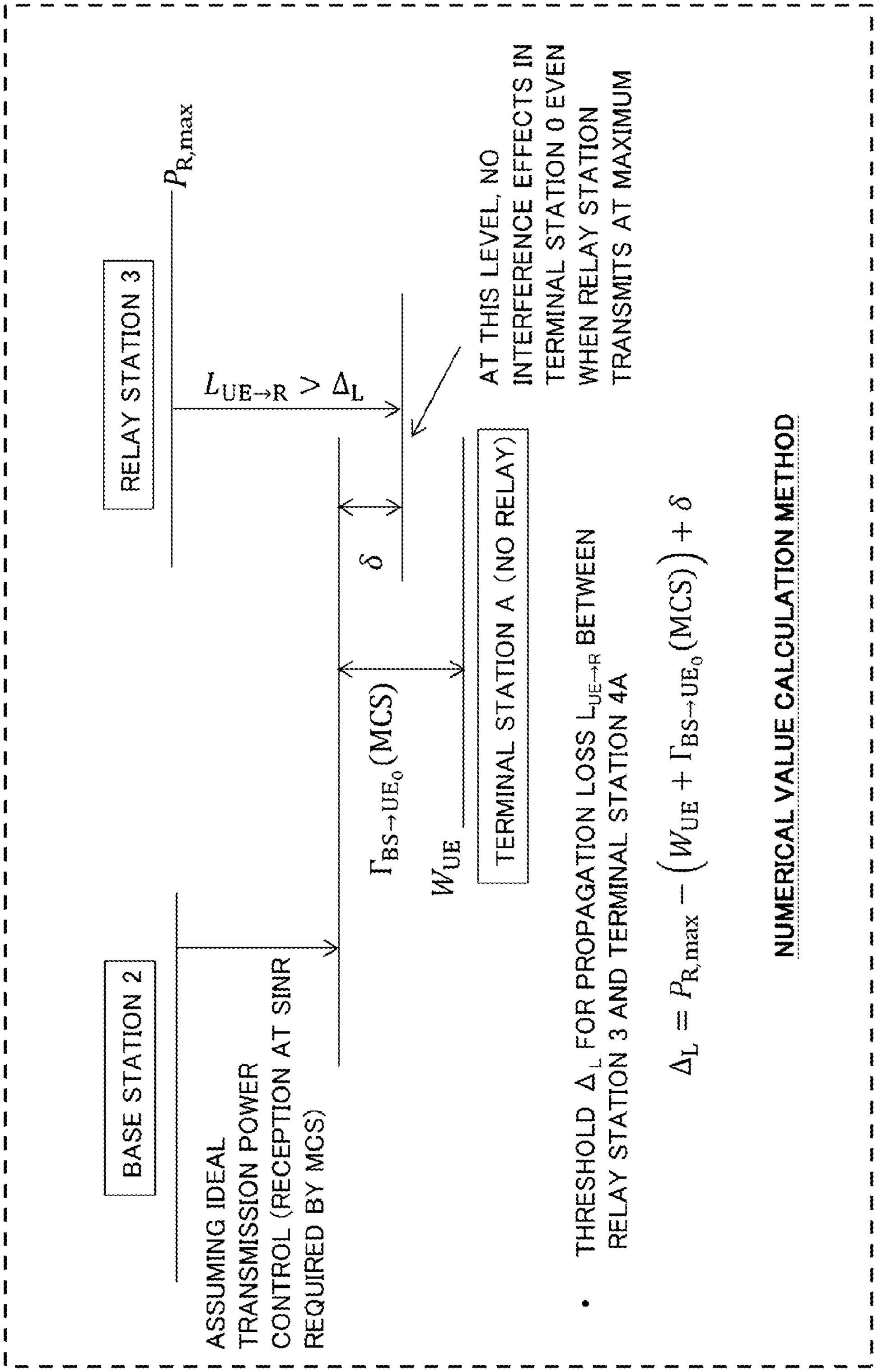
FIG. 4 is a view illustrating a numerical value calculation method and so on used in the first non-regenerative relay control method.

FIG. 4 is a view illustrating a numerical value calculation method and so on used in the first non-regenerative relay control method. P_(R, max), W_UE, Γ_UE(MCS), and δ have the relationship shown in FIG. 4, and therefore, when the propagation loss L_(UE→R) of the signal transmitted from the terminal station 4A and received by the relay station 3 is larger than the threshold Δ_L, this means that even if the relay station 3 uses the second resource block for downlink transmission, uplink transmission from the terminal station 4A will not be affected thereby (i.e., that the interference is allowable).

Figure 5:
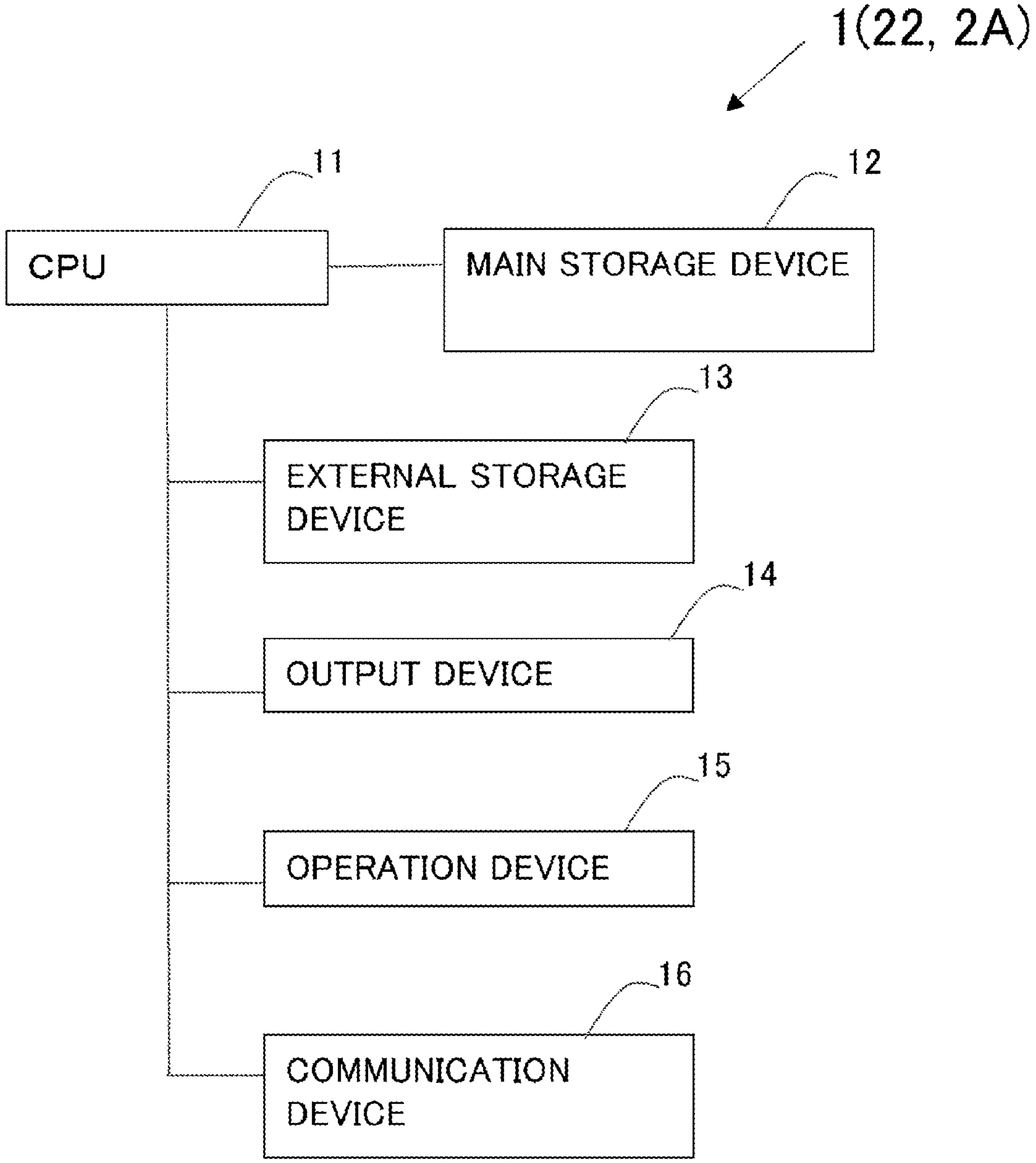
FIG. 5 is a view showing an example configuration of a control device.

FIG. 5 is a view illustrating an example of a hardware configuration of the control device 1. The control device 1 includes a CPU 11, a main storage device 12, and external devices, and executes communication processing and information processing using computer programs. The CPU 11 is also known as a processor. The CPU 11 is not limited to a single processor and may have a multi-processor configuration. Further, the CPU 11 may also include a Graphics Processing Unit (GPU), a Digital Signal Processor (DSP), and so on. Furthermore, the CPU 11 may cooperate with a hardware circuit such as a Field Programmable Gate Array (FPGA). The external devices include an external storage device 13, an output device 14, an operating device 15, and a communication device 16, for example.

The CPU 11 provides the processing of the control device 1 by executing a computer program that has been expanded to the main storage device 12 so as to be executable. The main storage device 12 stores the computer programs executed by the CPU 11, data processed by the CPU 11, and so on. The main storage device 12 is a Dynamic Random Access Memory (DRAM), a Static Random Access Memory (SPAM), a Read Only Memory (ROM), or the like. Further, the external storage device 13 is used, for example, as a storage area that supplements the main storage device 12, and stores the computer programs executed by the CPU 11, data processed by the CPU 11, and so on. The external storage device 13 is a hard disk drive, a Solid State Drive (SSD), or the like. Furthermore, a driving device of a detachable storage medium may be connected to the control device 1. The detachable storage medium is a Blu-ray Disc, a Digital Versatile Disc (DVD), a Compact Disc (CD), a flash memory card, or the like, for example.

The output device 14 is a display device such as a liquid crystal display or an electroluminescence panel, for example. Note that the output device 14 may also include a speaker or another device that outputs sound. The operating device 15 is a touch panel formed by laminating a touch sensor on a display, or the like, for example. The communication device 16 communicates with the base station 2 and an external network such as the Internet through optical fiber, for example. The communication device 16 is a gateway connected to the base station 2 and a gateway that communicates with an external network such as the Internet, for example. The communication device 16 may be a single device or a combination of a plurality of devices. Note that the hardware configuration of the control device 1 is not limited to that shown in FIG. 5.

Further, the control circuit 22 and the control circuit 2A of the base station 2, the control circuit 32 of the relay station 3, and the control circuit 42 of the terminal stations 4 and 4A, described above, are configured as devices including the CPU 11, the main storage device 12, and the external storage device 13, described above, and the CPUs 11 perform predetermined processing by executing programs.

Figure 6:
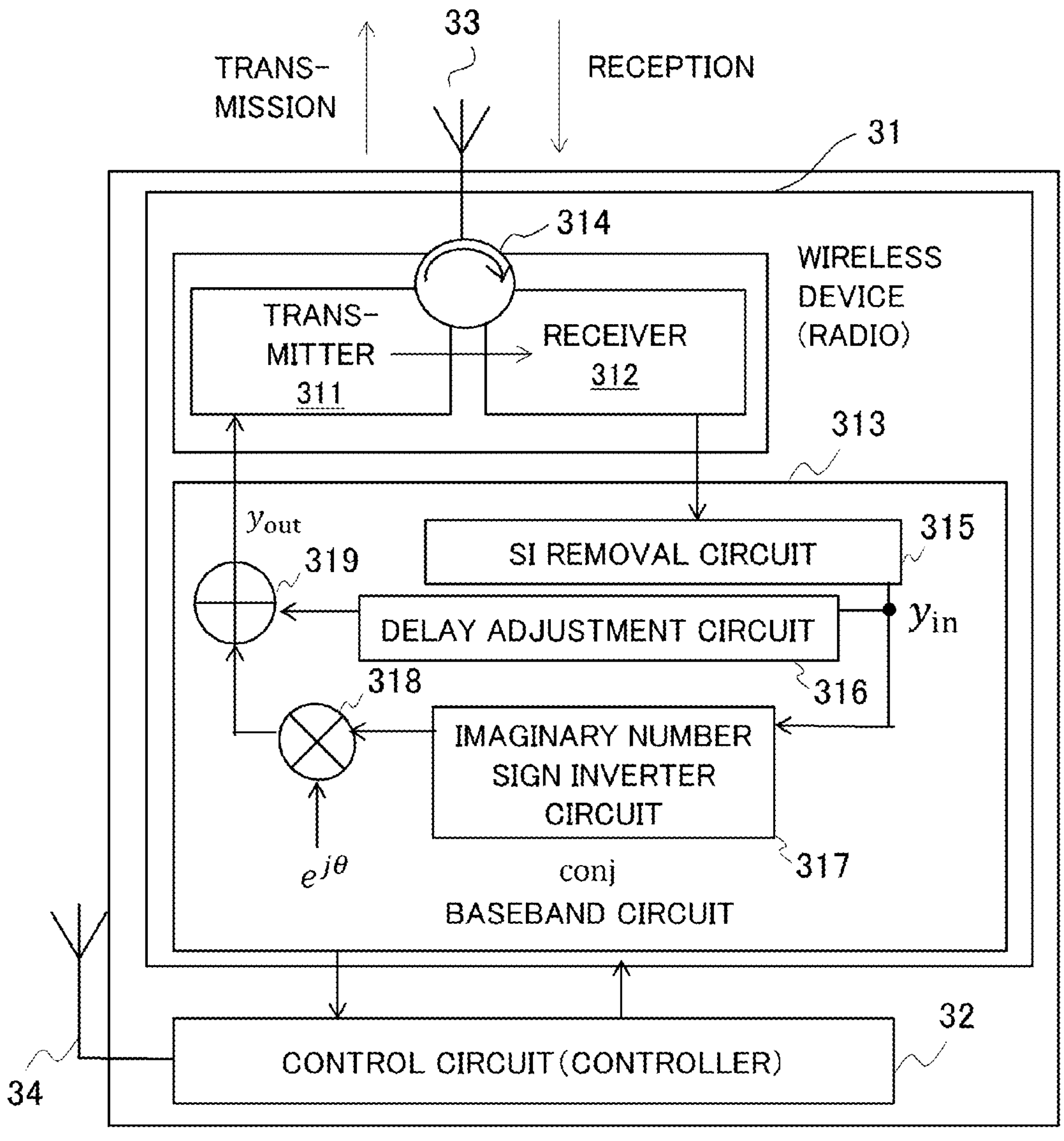
FIG. 6 is a view showing an example configuration of a relay station.

FIG. 6 is a view illustrating an example configuration of the relay station 3. In FIG. 6, the relay station 3 includes the antenna 33, the wireless device 31 corresponding to the antenna 33, and the control circuit (the controller) 32. FIG. 6 shows an example in which the relay station 3 includes one antenna 33, but the relay station 3 may have two or more antennae. In this case, the wireless device 31 is provided for each antenna 33.

The transceivers 31 have the same configuration. More specifically, the wireless device 31 includes a transmitter 311, a receiver 312, and a baseband circuit 313. The transmitter 311 and the receiver 312 are connected to the antenna 33 via a circulator 314. More specifically, the transmitter 311, the receiver 312, and the antenna 33 are connected to three ports of the circulator 314. A reception signal received by the antenna 33 is input into a first port of the circulator 314 and transmitted to the receiver 312 from a second port. A transmission signal from the transmitter 311 is input into a third port, for example, of the circulator 314 and transmitted to the antenna 33 from the first port.

Here, the power difference between the transmission signal and the reception signal is approximately 100 dB, for example. Meanwhile, the isolation of the circulator 314 is approximately 30 dB, and therefore a part of the transmission signal and the reception signal interfere with each other. The interference between a part of the transmission signal and the reception signal in the wireless device 31 is known as self-interference. The self-interference can be configured by setting predetermined weights on a Radio Frequency (RF) analog filter provided in the receiver 312 and an FIR filter included in the baseband circuit 313.

The receiver 312 receives a reception signal (for example, a wireless signal (a first wireless signal) from the base station 2) from the antenna 33 via the circulator 314. The receiver 312 includes a quadrature detection circuit and an analog/digital (AD) converter. The receiver 312 obtains a baseband signal by down-converting the reception signal by means of quadrature detection and converting the result into digital data using the AD converter. The receiver 312 inputs the obtained baseband signal into the baseband circuit 313.

The baseband circuit 313 includes a self-interference removal circuit 315, a delay adjustment circuit 316, an imaginary number sign inverter circuit 317, a multiplier 318, and an adder 319. The self-interference removal circuit 315 suppresses or removes a self-interfering transmission signal that is mixed into the baseband signal input from the receiver 312. An output signal of the self-interference removal circuit 315 is input into the delay adjustment circuit 316 and the imaginary number sign inverter circuit 317 as a signal y_(in). The signal y_(in) corresponds to a "first baseband signal".

A combined signal y_(out) using the first resource block and the additionally assigned second resource block is given by the following equation.

$$y\_(\text{out})=y\_(\text{in})+\text{conj}(y\_(\text{in}))e\hat{\ }j\theta \qquad \text{Equation:}$$

The imaginary number sign inverter circuit 317 performs conj processing (processing for obtaining a complex conjugate) and outputs a signal obtained by inverting the sign of only the imaginary number part of the signal y_(in), which is a complex signal. The multiplier 318 applies a predetermined phase rotation by multiplying e^jθ by the output signal of the imaginary number sign inverter circuit 317. The signal conj(y_(in))e^jθ corresponds to a "second baseband signal".

The delay adjustment circuit 316 applies a delay time equal to the processing time taken by the imaginary number sign inverter circuit 317 and the multiplier 318 to the signal y_(in) so as to align the signal start timings (the phase). The adder 319 adds together (combines) the output signal from the delay adjustment circuit 316 and the output signal of the imaginary number sign inverter circuit 317 and outputs a signal y_(out). The signal y_(out) is input into the transmitter 311, converted into a wireless signal directed toward the terminal station 4, and emitted from the antenna 33.

Figure 7:
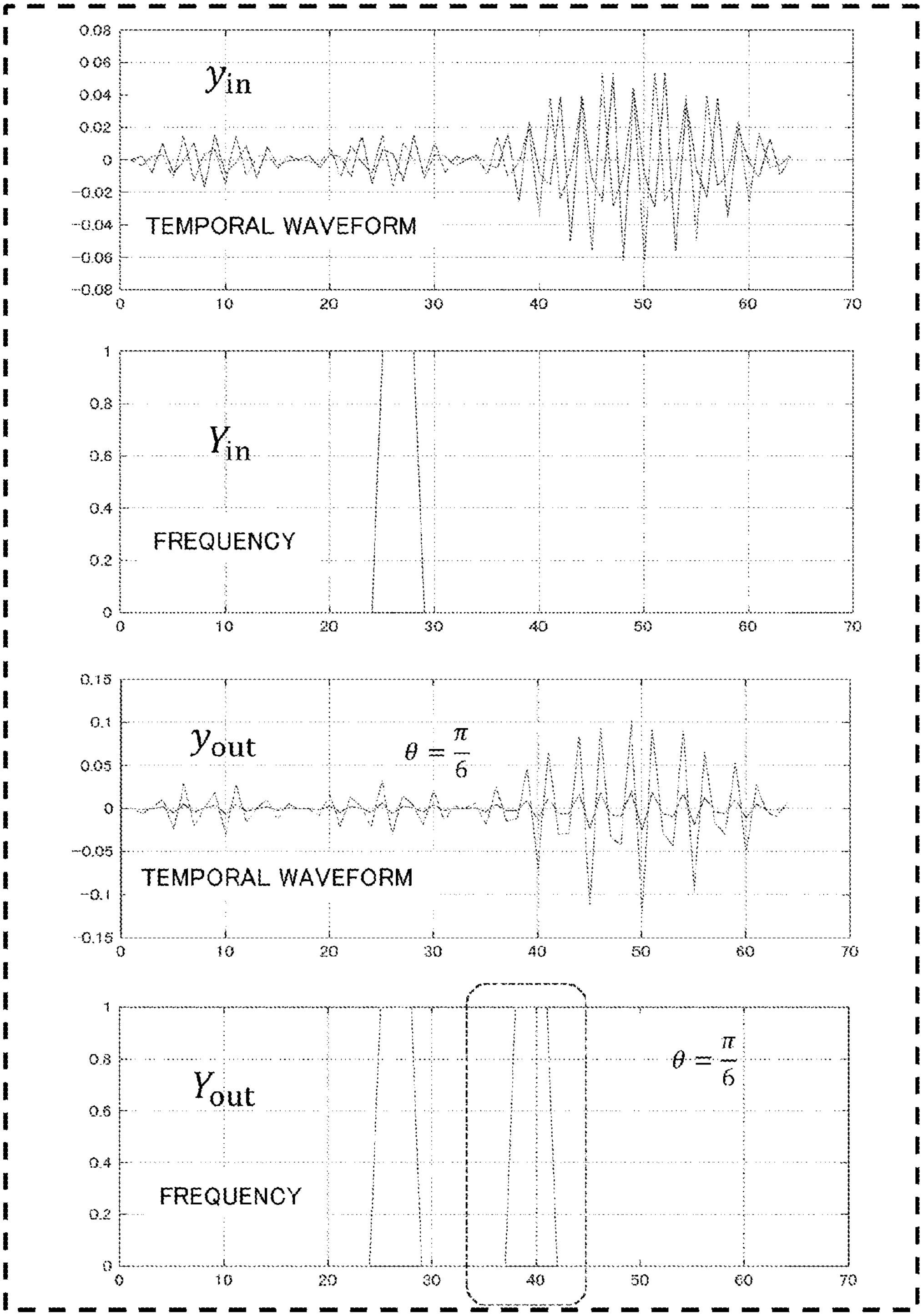
FIG. 7 is a view showing examples of respective waveforms of signals shown in FIG. 6.

FIG. 7 is a view illustrating examples of waveforms of the signals shown in FIG. 6. The waveform diagram in the uppermost section of FIG. 7 is a view illustrating the signal y_(in) in the time domain, while the second waveform diagram from the top is a view illustrating the signal y_(in) in the frequency domain. The diagrams show a frequency group corresponding to the first resource block, and the frequency group corresponds to the "+f" block shown in FIG. 3. The third waveform diagram from the top is a view illustrating the signal y_(out) in the time domain, while the waveform diagram in the lowermost section is a view illustrating the signal y_(out) in the frequency domain. The location surrounded by a dotted line shows a frequency group corresponding to the second resource block. Thus, the desired signal y_(out) can be obtained with the simple circuit configuration of the baseband circuit 313 shown in FIG. 6. Note that the self-interference removal circuit 315 and the delay adjustment circuit 316 can be configured by setting a predetermined weight on the FIR filter, for example. The circuit that forms the baseband signals may be a digital circuit constituted by circuit elements or a circuit formed logically using a DSP or an FPGA.

The control circuit 32 can communicate with the control circuit 22 and the control circuit 2A of the base station 2 or the control device 1 (referred to as the control circuit 22 or the like) using the antenna 34. Upon receipt of an instruction from the control circuit 22 or the like, the control circuit 32 performs processing for measuring the reception signal strength of the transmission signal from the terminal station 4A and transmitting the measurement result to the control circuit 22 or the like. Further, having obtained information indicating that the second resource block is to be assigned, the control circuit 32 controls the baseband circuit 313 so as to generate the signal y_(out).

Furthermore, when the first resource block and the second resource block have been assigned, the terminal station 4 receives a notification indicating that the resource blocks have been assigned. Accordingly, since the resource blocks to be used in the non-regenerative relay signal are known, the control circuit 42 of the terminal station 4 can obtain frequency diversity gain (=the same as continuous transmission (transmitting the same data a plurality of times) on the frequency axis) by performing normal reception processing (FFT processing, equalization processing, resource block combination processing, and demodulation processing) on the signal received by the transceiver.

Figure 8:
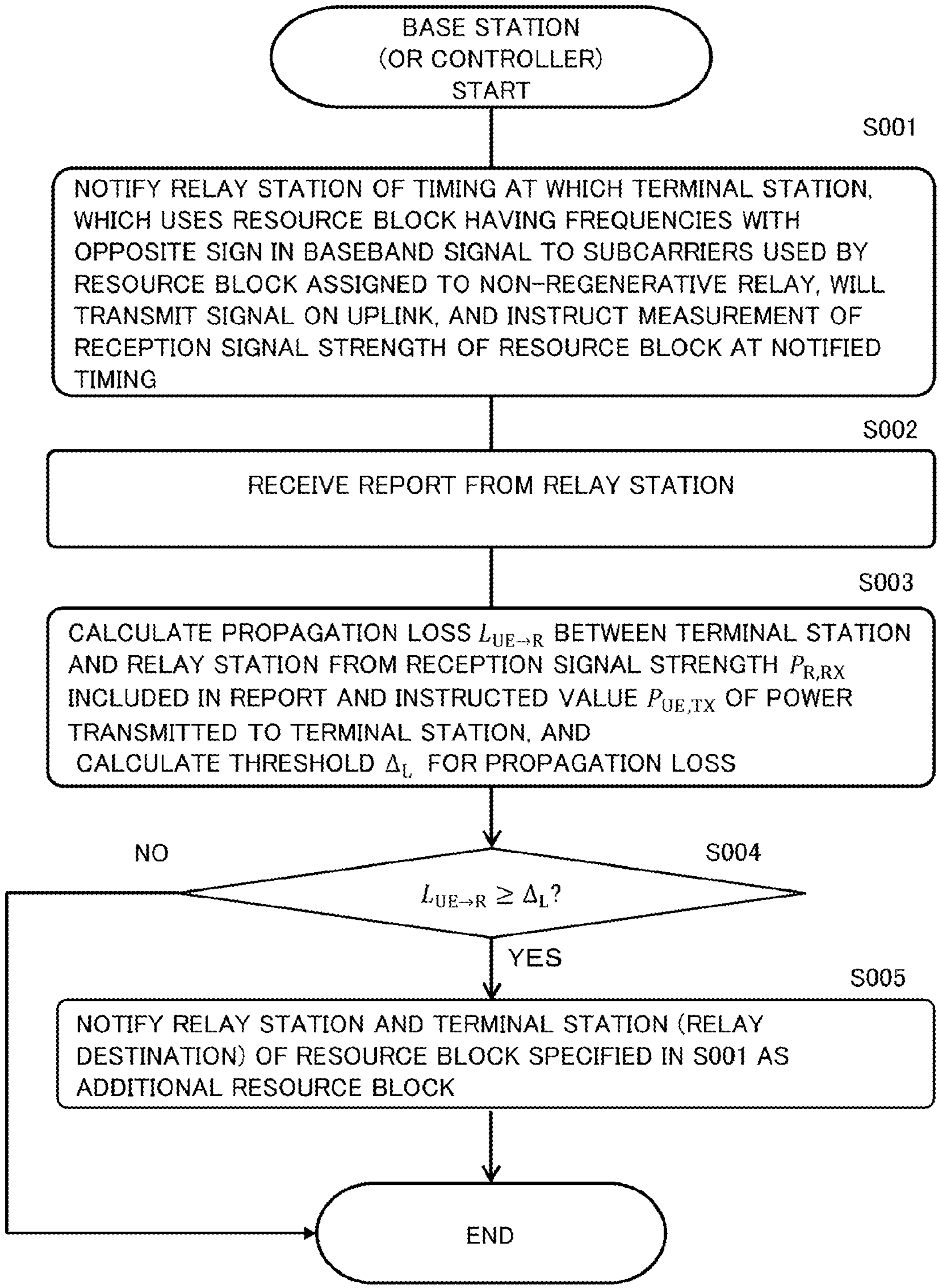
FIG. 8 is a flowchart showing an example of processing executed by a base station or the control device in the first non-regenerative relay control method.

FIG. 8 is a flowchart illustrating an example of the processing executed by the base station or the control device (the control circuit 22 or the control device 1) in the first non-regenerative relay control method. Here, FIG. 8 shows an example in which the control circuit 22 is the main performer of the processing, but the control circuit 2A or the control device 1 may be the main performer of the processing.

In step S001, the control circuit 22 notifies the relay station 3 of (transmits to the relay station 3) information indicating a timing at which the terminal station 4A, which uses a resource block (the second resource block) having frequencies with the opposite sign in the baseband signal to the subcarriers used by the resource block (the first resource block) assigned to non-regenerative relay, will transmit a signal on the uplink. Further, the control circuit 22 transmits an instruction to the relay station 3 to measure the reception signal strength of the signal from the terminal station 4A using the second resource block at the notified timing. The notification and the instruction may be transmitted at the same timing or at different timings.

In step S002, the control circuit 22 receives a report from the relay station 3. In step S003, the control circuit 22 calculates the propagation loss L_(UE→R) between the terminal station 4A and the relay station 3 from the reception signal strength P_(R, RX) included in the report and the instructed value P_(UE, TX) of the power transmitted to the terminal station 4A. Further, the control circuit 22 calculates the threshold Δ_(L) for the propagation loss L_(UE→R).

In step S004, the control circuit 22 calculates whether or not the propagation loss L_(UE→R) equals or exceeds the threshold Δ_(L) (determining whether or not the propagation loss exceeds the threshold is also possible). When it is determined that the propagation loss equals or exceeds the threshold, the processing advances to step S005, and in other cases, the processing of FIG. 8 is terminated.

In step S005, the control circuit 22 notifies the relay station 3 and the terminal station 4 of the resource block specified in step S001, i.e., the second resource block, as an additional resource block. In other words, the control circuit 22 transmits information to the relay station 3 and the terminal station 4 indicating that the second resource block is to be assigned.

Upon receipt of the information indicating that the second resource block is to be assigned, the relay station starts to generate the signal y_(out), whereupon a wireless signal obtained by converting y_(out) is transmitted from the relay station 3 as a non-regenerative relay signal. After receiving the information indicating that the second resource block is to be assigned, the terminal station 4 receives the signal transmitted using the first resource block and the second resource block, and as a result, frequency diversity gain (a diversity effect) can be obtained in the terminal station 4.

Figure 9:
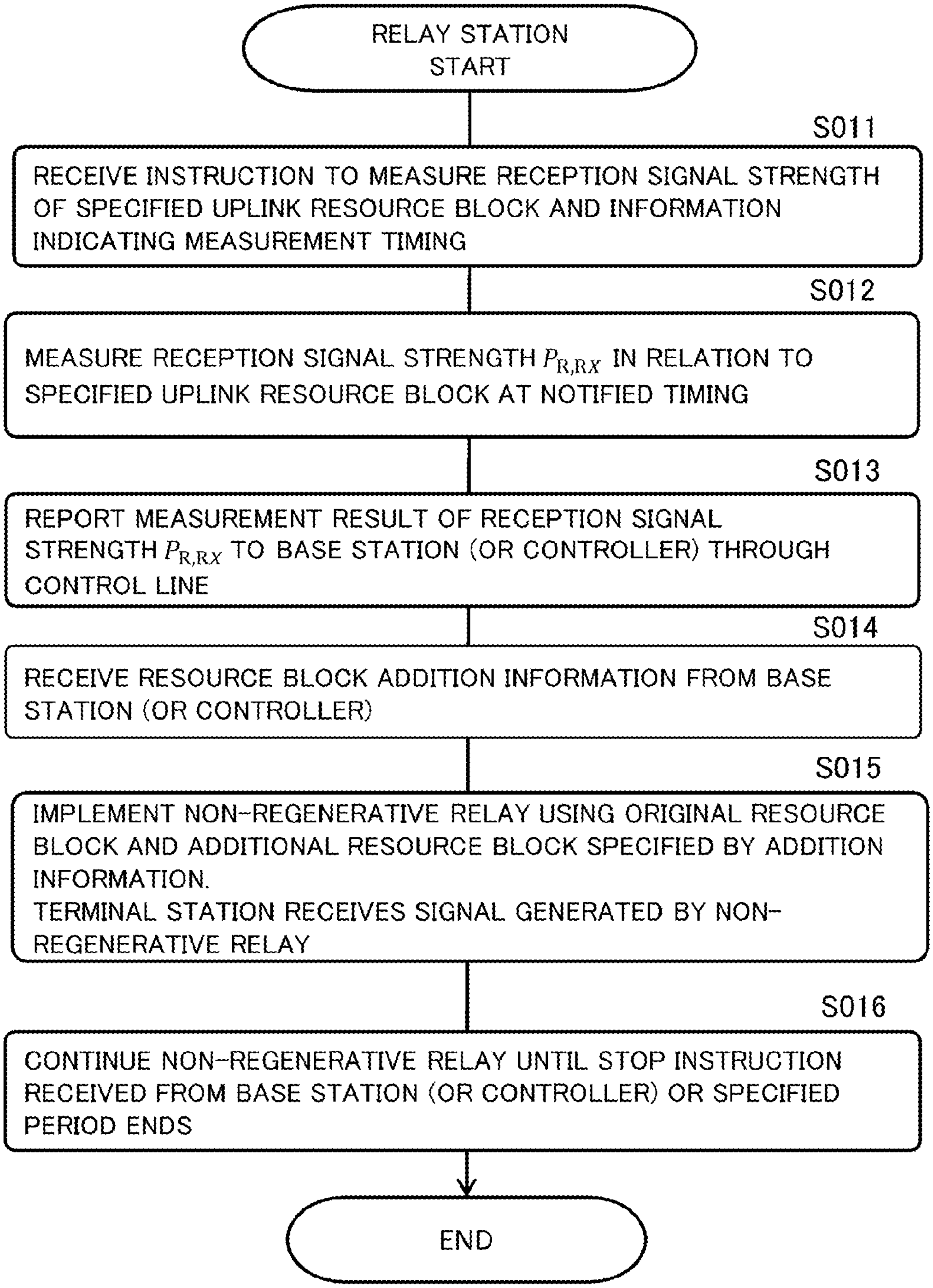
FIG. 9 is a flowchart showing an example of processing executed by the relay station in the first non-regenerative relay control method.

FIG. 9 is a flowchart illustrating an example of the processing executed by the relay station in the first non-regenerative relay control method. In step S011, the control circuit 32 of the relay station 3 receives the instruction issued by the control circuit 22 to measure the reception signal strength of the uplink resource block (the second resource block) of the terminal station 4A, and information indicating the measurement timing.

In step S012, the control circuit 32 measures the reception signal strength P_(R, RX) in relation to the specified uplink resource block at the timing notified by the control circuit 22.

In step S013, the control circuit 32 transmits the measurement result of the reception signal strength P_(R, RX) to the control circuit 22 of the base station 2 through a control line using the antenna 34.

In step S014, the control circuit 32 receives resource block addition information, or in other words information indicating that the second resource block is to be assigned, from the control circuit 22 of the base station 2. In step S015, the control circuit 32 implements non-regenerative relay using the original resource block (the first resource block) and the additional resource block (the second resource block) specified by the addition information. The terminal station 4 receives the signal generated by the non-regenerative relay.

In step S016, the control circuit 32 implements the non-regenerative relay described in step S015 until a stop instruction is received from the control circuit 22 of the base station 2 or a specified period ends (expires).

Figure 10:
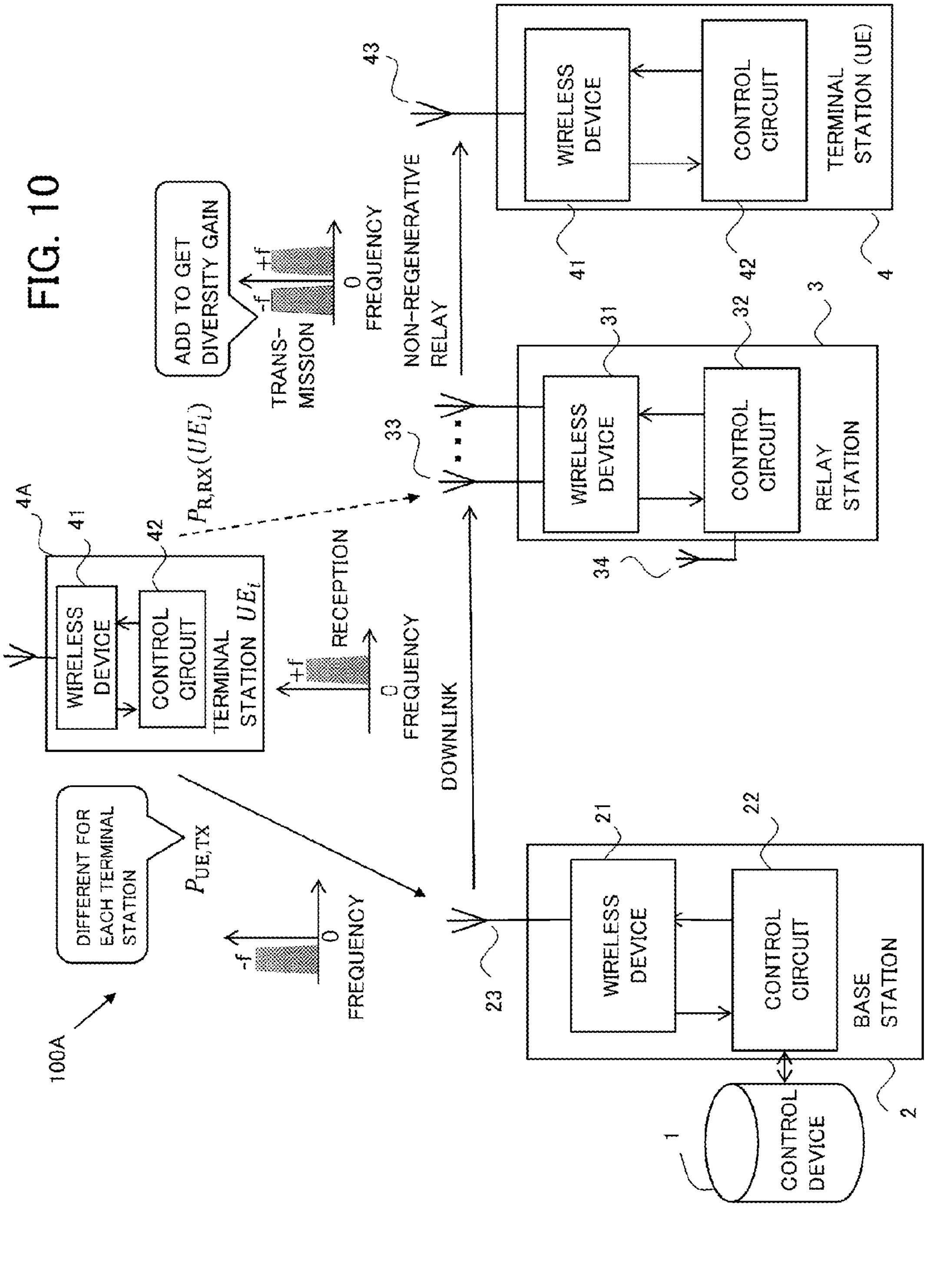
FIG. 10 is a view illustrating a second non-regenerative relay control method.

FIG. 10 is a view illustrating a second non-regenerative relay control method. In the second non-regenerative relay control method, with respect to one, two, or more terminal stations 4A (referred to as terminal stations UE_(i), where i is the number of the terminal station 4A) that transmit uplink signals at the same timing as the timing at which the relay station 3 transmits a downlink signal using the first resource block, the relay station 3 measures the reception signal strength of the signal transmitted from each terminal station UE_(i).

When, based on the measurement result, the propagation loss L_(UE→R) (UE_(i)) between the terminal station UE_(i) and the relay station 3 equals or exceeds (or exceeds) a threshold Δ, the control circuit 22 of the base station 2 (or the control circuit 2A or the control device 1) assigns the second resource block to the terminal station UE_(i) having the largest propagation loss L_(UE→R) (UE_(i)), among the corresponding terminal stations UE_(i). The control circuit 22 then assigns the second resource block to the relay station 3 and the terminal station 4 as an additional resource block to the first resource block. Thus, even when the relay station 3 performs non-regenerative relay using the first and second resource blocks, the effect of interference between the non-regenerative relay signal and the transmission signal from the terminal station 4A is kept within an allowable range. In the terminal station 4, meanwhile, frequency diversity gain can be obtained, and as a result, a favorable downlink quality can be obtained.

The following equation, for example, can be used to calculate the threshold Δ_L (UE_(i)) for the propagation loss L_(UE→R) (UE_(i)).

$$\Delta\_L(UE\_(i))=P\_(R,\max)-(W\_UE\_(i)+\Gamma\_UE\_(i)(MCS))+\delta \qquad \text{Equation:}$$

Here, P_(R, max) is the maximum transmission power allowed by the relay station 3. W_UE is the noise level (a prescribed value) of the terminal station 4A. Γ_UE_(i) (MCS) is the SINR required of the terminal station UE_(i) (an example of a value indicating the desired quality of the downlink). Further, δ is a margin, which is normally set at 6 dB. Note, however, that the value of the margin can be set as appropriate.

Figure 11:
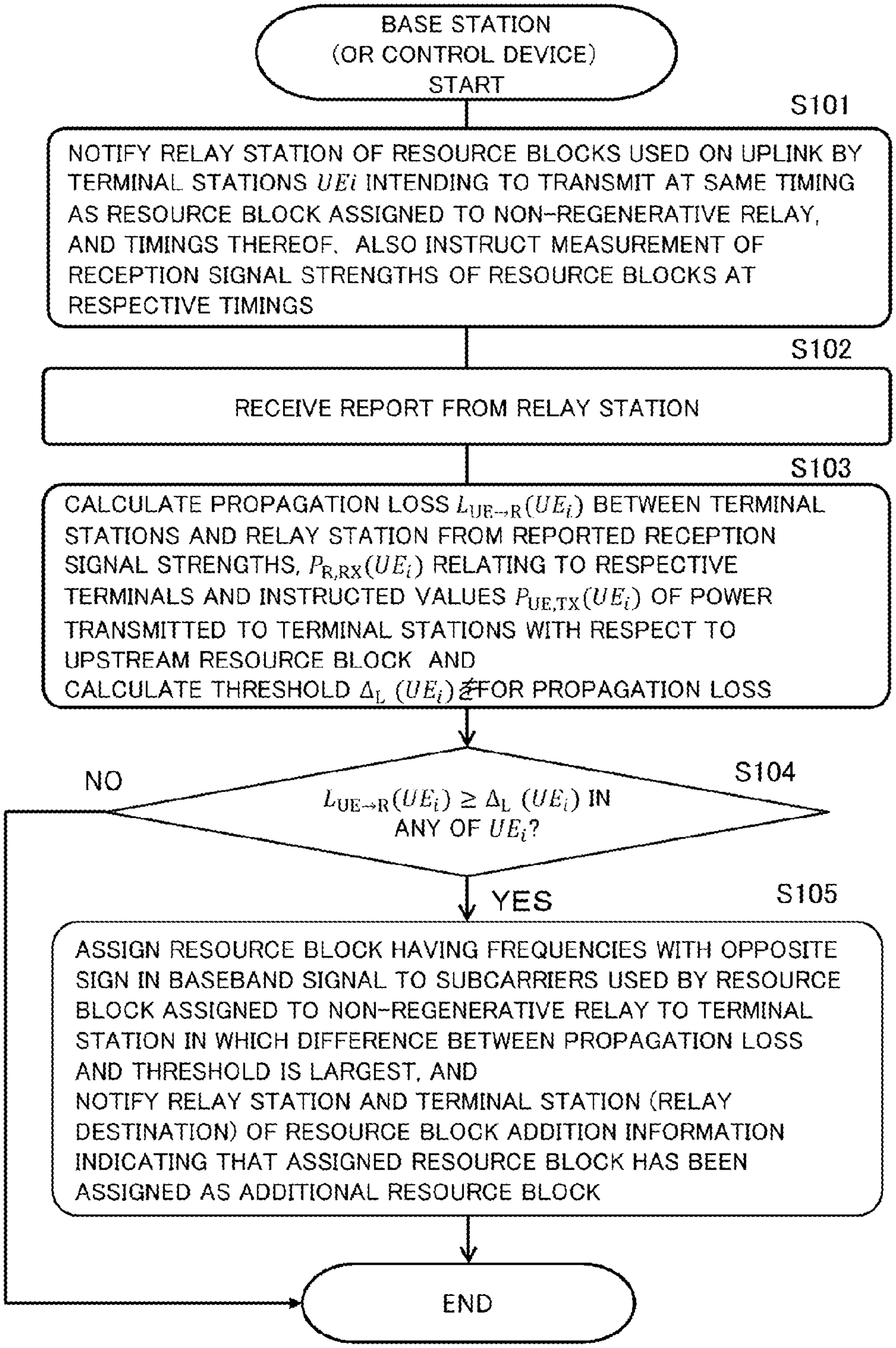
FIG. 11 is a flowchart showing an example of processing executed by the base station or the control device in the second non-regenerative relay control method.
Figure 12:
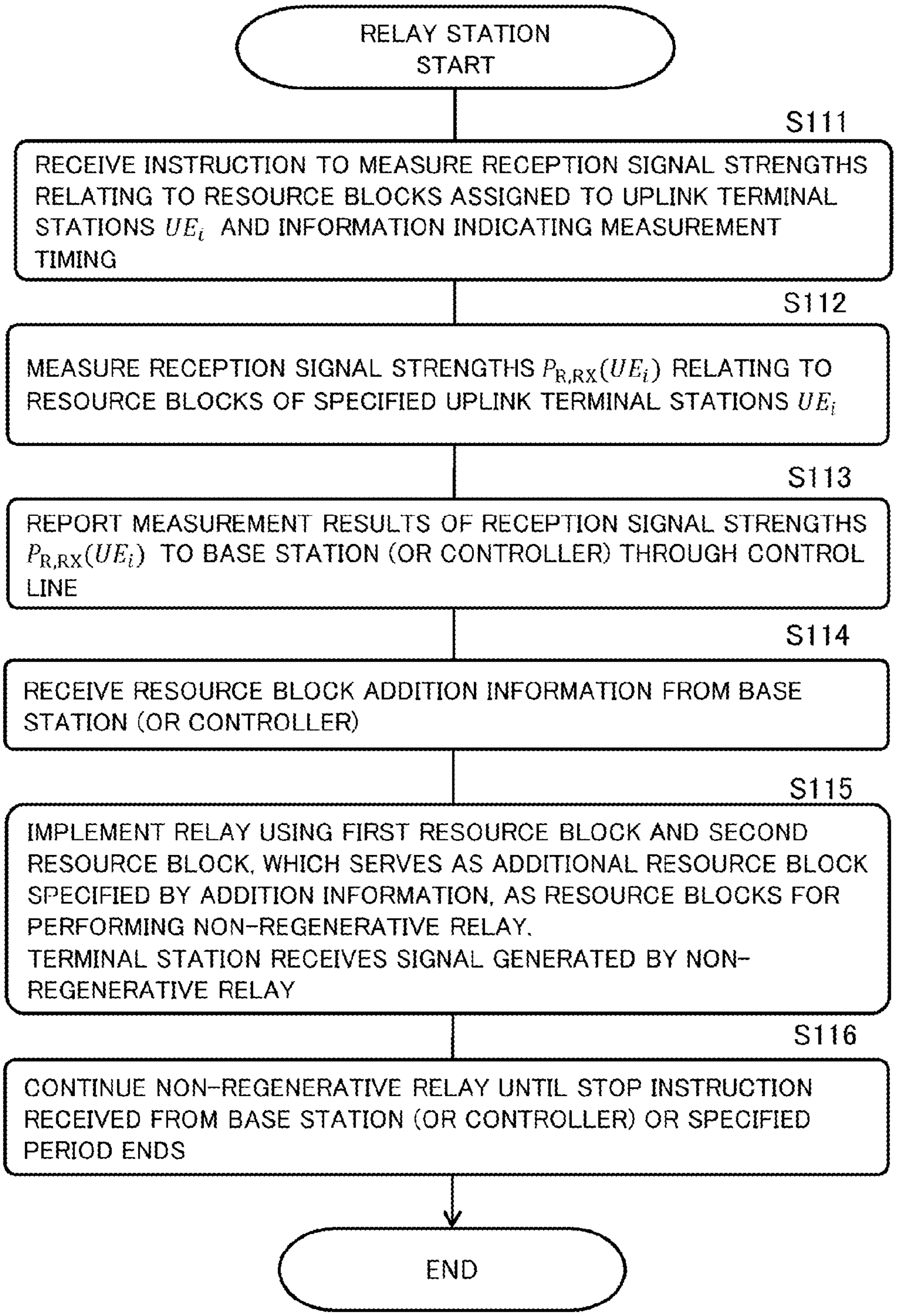
FIG. 12 is a flowchart showing an example of processing executed by the relay station in the second non-regenerative relay control method.

FIG. 11 is a flowchart illustrating an example of the processing executed by the base station or the control device in the second non-regenerative relay control method. FIG. 12 is a flowchart illustrating an example of the processing executed by the relay station in the second non-regenerative relay control method.

In step S101 of FIG. 11, the control circuit 22 of the base station 2 (or the control device 1 or the control circuit 2A) notifies the relay station 3 of the resource blocks to be used on the uplink by the terminal stations 4A (UE_(i)) that are intending to transmit at the same timing as the resource block (the first resource block) assigned to non-regenerative relay, and the transmission timings thereof. Further, the control circuit 22 instructs the relay station 3 to measure the reception signal strengths in the relay station 3 of the signals transmitted by the terminal stations UE_(i) at the notified transmission timings.

The relay station 3 receives the instruction to measure the reception signal strengths in relation to the resource blocks respectively assigned to the uplink terminal stations (UE_(i)) and information indicating the measurement timing (step S111 in FIG. 12). Accordingly, the relay station 3 measures the reception signal strengths P_(R, RX) (UE_(i)) in the relay station 3 of the uplink signals transmitted by the terminal stations UE_(i) using the resource blocks assigned respectively thereto (step S112 in FIG. 12). The relay station 3 reports (transmits) the measurement results to the control circuit 22 of the base station 2 through a control line (step S113 in FIG. 12).

In step S102, the control circuit 22 of the base station 2 receives the report from the relay station 3. In step S103, the control circuit 22 calculates the propagation loss L (UE→R) (UE_(i)) between each terminal station UE_(i) and the relay station 3 from the reported reception signal strengths P_(R, RX) (UE_(i)) relating to the respective terminal stations UE_(i) and instructed values P_(UE, RX) (UE_(i)) of the power transmitted to the terminal stations 4A on the uplink resource blocks. The control circuit 22 also calculates the threshold Δ_L (UE_(i)) for the propagation loss.

In step S104, the control circuit 22 determines whether or not the propagation loss L (UE→R) (UE_(i)) equals or exceeds the threshold Δ_L (UE_(i)) in any of the terminal stations UE_(i). When it is determined that there is a terminal station in which the propagation loss L_(UE→R) (UE_(i)) equals or exceeds the threshold Δ_L (UE_(i)), the processing advances to step S105, and when it is determined that this is not the case, the processing of FIG. 11 is terminated.

In step S105, a resource block (the second resource block) having frequencies with the opposite sign in the baseband signal to the subcarriers used by the resource block (the first resource block) assigned to non-regenerative relay is assigned to the terminal station UE_(i) in which the difference between the propagation loss L_(UE→R) (UE_(i)) and the threshold Δ_L (UE_(i)) is largest, among the terminal stations UE_(i) in which the propagation loss equals or exceeds the threshold Δ_L (UE_(i)). Further, the control circuit 22 notifies the relay station 3 and the terminal station 4 of resource block addition information indicating that the second resource block has been assigned as an additional resource block.

The relay station receives the resource block addition information from the control circuit 22 (step S114 in FIG. 12). The relay station 3 then implements non-regenerative relay using the first resource block, in which the non-regenerative relay is performed, and the additional resource block (the second resource block) specified by the addition information (step S115 in FIG. 12). The terminal station 4 receives the signal generated by the non-regenerative relay. As a result, frequency diversity gain can be obtained.

The relay station 3 continues the non-regenerative relay until a stop instruction is received from the control circuit 22 of the base station 2 or a specified period ends (expires) (step S116 in FIG. 12).

In this embodiment, the following processing is performed as the non-regenerative relay control method in the communication system 100A (100B) in which the relay station 3 non-regeneratively relays a signal from the base station 2 (the transmitting station) to the terminal station 4 (the first receiving station). More specifically, the control circuit 22 or the control circuit 2A of the base station 2 or the control device 1 (the control circuit 22 or the like, the information processing apparatus), which controls the non-regenerative relay, performs the following processing. When the relay station 3 performs the non-regenerative relay using the first resource block, which is assigned to the relay station 3 and the terminal station 4 for the non-regenerative relay, and the second resource block that uses a baseband signal obtained by inverting the frequencies of the baseband signal relating to the first resource block, the control circuit 22 or the like determines, based on information indicating the reception signal strength of a signal received by the relay station 3 from the terminal station 4A (the second receiving station), which differs from the terminal station 4, whether or not interference with the terminal station 4A is allowable. Then, after determining that the interference is allowable, the control circuit 22 or the like assigns the second resource block to the relay station 3 and the terminal station 4 as an additional resource block for the non-regenerative relay. As a result, frequency diversity can be obtained in the terminal station 4 in a state where interference with the terminal station 4A is allowed.

The determination as to whether or not the interference is allowable may be made based on information indicating the reception signal strength in the relay station 3 of a signal transmitted by the terminal station 4A using the second resource block assigned to the terminal station 4A.

The control circuit 22 or the like transmits, to the relay station 3, information indicating a timing for the terminal station 4A to transmit a signal using the second resource block, and an instruction to measure the reception signal strength in the relay station 3 of the signal transmitted by the terminal station 4A at the timing. Further, the control circuit 22 or the like receives, from the relay station 3, information indicating the reception signal strength in the relay station 3 of the signal transmitted by the terminal station 4A, the reception signal strength having been acquired by the relay station 3 by measurement.

The determination as to whether or not the interference is allowable may be executed by determining whether or not the propagation loss between the terminal station 4A and the relay station 3 exceeds a threshold, the propagation loss having been calculated based on information indicating the reception signal strength in the relay station 3 of a transmission signal transmitted by the terminal station 4A using the second resource block, and the transmission power value used by the terminal station 4A to transmit the transmission signal.

The threshold may be calculated using the maximum transmission power allowed by the relay station 3, the noise level of the terminal station 4A, a value indicating a desired downlink quality between the base station 2 and the terminal station 4A (the desired SINR of the downlink MCS), and a margin.

The control circuit 22 or the like may transmit, to the relay station 3, information indicating one, two, or more terminal stations 4A (the terminal stations UE_(i)) that are intending to transmit uplink signals at an identical timing to the timing at which the relay station 3 transmits a signal using the first resource block, and information indicating the resource blocks used respectively by the one, two, or more terminal stations 4A to transmit the uplink signals. The control circuit 22 or the like may receive, from the relay station 3, information indicating the reception signal strengths in the relay station 3 of the uplink signals transmitted by the one, two, or more terminal stations 4A, the reception signal strengths having been acquired by the relay station 3 by measurement.

The determination as to whether or not the interference is allowable may be made by determining whether or not the propagation loss between each of the one, two, or more terminal stations 4A and the relay station 3 exceeds a threshold, the propagation loss having been calculated based on information indicating the reception signal strengths in the relay station 3 of the uplink signals transmitted respectively by the one, two, or more terminal stations 4A and the transmission power values respectively used by the one, two, or more terminal stations 4A to transmit the uplink signals. In this case, the control circuit 22 or the like may assign the second resource block to the terminal station 4A with the largest propagation loss, among the terminal stations 4A in which the propagation loss exceeds the threshold, as the resource block to be used for transmission at the same timing as the timing at which the relay station 3 performs transmission using the first resource block.

The threshold may be calculated using the maximum transmission power allowed by the relay station 3, the respective noise levels of the one, two, or more terminal stations 4A, a value indicating the desired downlink quality between the base station 2 and each of the one, two, or more terminal stations 4A, and a margin.

The relay station 3 may receive, from the control circuit 22 or the like, information indicating a timing for the terminal station 4A to transmit a signal using the second resource block, and an instruction to measure the reception signal strength in the relay station 3 of the signal transmitted by the terminal station 4A at the timing. The relay station 3 may transmit, to the control circuit 22 or the like, information indicating the reception signal strength in the relay station 3 of the signal transmitted by the terminal station 4A, the reception signal strength having been acquired by measurement in accordance with the measurement instruction.

The relay station 3 may receive, from the control circuit 22 or the like, information indicating one, two, or more terminal stations 4A that are intending to transmit uplink signals at an identical timing to the timing at which the relay station 3 transmits a signal using the first resource block, and information indicating the resource blocks used respectively by the one, two, or more terminal stations 4A to transmit the uplink signals. The relay station 3 may transmit, to the control circuit 22 or the like, information indicating the reception signal strengths in the relay station 3 of the uplink signals transmitted by the one, two, or more terminal stations 4A, the reception signal strengths having been acquired by the relay station 3 by measurement.

Furthermore, the relay station 3 may include the antenna 33, the receiver 312 that converts a signal from the base station 2, received by the antenna 33, into the first baseband signal, the baseband circuit 313 that generates the second baseband signal relating to the second resource block by obtaining the complex conjugate of the first baseband signal, and the transmitter 311 that converts a signal combining the first baseband signal and the second baseband signal into a wireless signal to be non-regeneratively relayed to the terminal station 4 (the first receiving station).

The embodiment described above is merely an example, and the present disclosure can be implemented with appropriate modifications within a scope not departing from the spirit thereof. Moreover, the processing and means described in the present disclosure can be freely combined and implemented thus as long as no technical contradictions arise as a result.

In addition, processing described as being performed by a single device may be apportioned to and executed by a plurality of devices. Alternatively, processing described as being performed by different devices may be executed by a single device. In the computer system, the hardware configuration (server configuration) used to realize the functions thereof is flexible and can be modified.

The present disclosure can also be realized by supplying a computer with a computer program installed with the functions described in the above embodiment, and having one or more processors provided in the computer read and execute the program. The computer program may be provided to the computer by a non-temporary computer-readable storage medium that can be connected to a system bus of the computer, or may be provided to the computer over a network. For example, the non-temporary computer-readable storage medium includes any of various types of discs, such as a magnetic disc (a floppy (registered trademark) disc, a hard disc drive (HDD), or the like) or an optical disc (a CD-ROM, a DVD disc, a Blu-Ray disc, or the like), and any of various types of media suitable for storing electronic commands, such as a read-only memory (ROM), a random access memory (RAM), an EPROM, an EEPROM, a magnetic card, a flash memory, or an optical card.

What is claimed is:

1. A non-regenerative relay control method in a communication system in which a relay station non-regeneratively relays a signal from a transmitting station to a first receiving station, the method comprising:

in a case where the relay station performs the non-regenerative relay using a first resource block that is assigned to the relay station and the first receiving station for the non-regenerative relay and a second resource block that uses a baseband signal obtained by inverting frequencies of a baseband signal relating to the first resource block, determining, by an information processing apparatus, which is made based on information indicating a reception signal strength of a signal received by the relay station from a second receiving station other than the first receiving station, as to whether or not interference with the second receiving station is allowable; and assigning, by the information processing apparatus, the second resource block to the relay station and the first receiving station as an additional resource block for the non-regenerative relay when it is determined that the interference is allowable.

2. The non-regenerative relay control method according to claim 1, wherein the determining as to whether or not the interference is allowable includes determining whether or not the interference is allowable based on information indicating the reception signal strength in the relay station of a signal transmitted by the second receiving station using the second resource block assigned to the second receiving station.

3. The non-regenerative relay control method according to claim 1, further comprising:

transmitting, by the information processing apparatus, to the relay station, information indicating a timing for the second receiving station to transmit a signal using the second resource block, and an instruction to measure the reception signal strength in the relay station of the signal transmitted by the second receiving station at the timing; and receiving, by the information processing apparatus, from the relay station, information indicating the reception signal strength in the relay station of the signal transmitted by the second receiving station, the reception signal strength having been acquired by the relay station by measurement.

4. The non-regenerative relay control method according to claim 1, wherein the determining as to whether or not the interference is allowable includes determining whether or not propagation loss between the second receiving station and the relay station exceeds a threshold, the propagation loss having been calculated based on information indicating the reception signal strength in the relay station of a transmission signal transmitted by the second receiving station using the second resource block, and a transmission power value used by the second receiving station to transmit the transmission signal.

5. The non-regenerative relay control method according to claim 4, wherein the threshold is calculated using the maximum transmission power allowed by the relay station, a noise level of the second receiving station, a value indicating a desired downlink quality between the transmitting station and the second receiving station, and a margin.

6. The non-regenerative relay control method according to claim 1, further comprises:

transmitting, by the information processing apparatus, to the relay station, information indicating one, two, or more second receiving stations that are intending to transmit uplink signals at an identical timing to the timing at which the relay station transmits a signal using the first resource block, and information indicating resource blocks used respectively by the one, two, or more second receiving stations to transmit the uplink signals; and receiving, by the information processing apparatus, from the relay station, information indicating reception signal strengths in the relay station of the uplink signals transmitted by the one, two, or more second receiving stations, the reception signal strengths having been acquired by the relay station by measurement.

7. The non-regenerative relay control method according to claim 1, wherein:

the determining as to whether or not the interference is allowable includes determining whether or not propagation loss between each of the one, two, or more second receiving stations and the relay station exceeds a threshold, the propagation loss having been calculated based on information indicating the reception signal strengths in the relay station of uplink signals transmitted respectively by the one, two, or more second receiving stations and transmission power values respectively used by the one, two, or more second receiving stations to transmit the uplink signals; and the information processing apparatus assigns the second resource block to the second receiving station with the largest propagation loss, among the second receiving stations in which the propagation loss exceeds the threshold, as the resource block to be used for transmission at the same timing as the timing at which the relay station performs transmission using the first resource block.

8. The non-regenerative relay control method according to claim 7, wherein the threshold is calculated using the maximum transmission power allowed by the relay station, respective noise levels of the one, two, or more second receiving stations, a value indicating a desired downlink quality between the transmitting station and each of the one, two, or more second receiving stations, and a margin.

9. An information processing apparatus that controls non-regenerative relay in a communication system in which a relay station non-regeneratively relays a signal from a transmitting station to a first receiving station, the information processing apparatus comprising a controller that executes:

in a case where the relay station performs the non-regenerative relay using a first resource block that is assigned to the relay station and the first receiving station for the non-regenerative relay and a second resource block that uses a baseband signal obtained by inverting frequencies of a baseband signal relating to the first resource block, determining, which is made based on information indicating a reception signal strength of a signal received by the relay station from a second receiving station other than the first receiving station, as to whether or not interference with the second receiving station is allowable; and assigning the second resource block to the relay station and the first receiving station as an additional resource block for the non-regenerative relay when it is determined that the interference is allowable.

10. The information processing apparatus according to claim 9, wherein the controller determines whether or not the interference is allowable based on information indicating the reception signal strength in the relay station of a signal transmitted by the second receiving station using the second resource block assigned to the second receiving station.

11. The information processing apparatus according to claim 9, wherein the controller further executes:

transmitting, to the relay station, information indicating a timing for the second receiving station to transmit a signal using the second resource block, and an instruction to measure the reception signal strength in the relay station of the signal transmitted by the second receiving station at the timing; and receiving, from the relay station, information indicating the reception signal strength in the relay station of the signal transmitted by the second receiving station, the reception signal strength having been acquired by the relay station by measurement.

12. The information processing apparatus according to claim 9, wherein the controller determines whether or not propagation loss between the second receiving station and the relay station exceeds a threshold, the propagation loss having been calculated based on information indicating the reception signal strength in the relay station of a transmission signal transmitted by the second receiving station using the second resource block, and a transmission power value used by the second receiving station to transmit the transmission signal.

13. The information processing apparatus according to claim 12, wherein the threshold is calculated using the maximum transmission power allowed by the relay station, a noise level of the second receiving station, a value indicating a desired downlink quality between the transmitting station and the second receiving station, and a margin.

14. The information processing apparatus according to claim 9, wherein the controller further executes:

transmitting, to the relay station, information indicating one, two, or more second receiving stations that are intending to transmit uplink signals at an identical timing to the timing at which the relay station transmits a signal using the first resource block, and information indicating resource blocks used respectively by the one, two, or more second receiving stations to transmit the uplink signals; and receiving, from the relay station, information indicating reception signal strengths in the relay station of the uplink signals transmitted by the one, two, or more second receiving stations, the reception signal strengths having been acquired by the relay station by measurement.

15. The information processing apparatus according to claim 9, wherein:

the controller determines whether or not propagation loss between each of the one, two, or more second receiving stations and the relay station exceeds a threshold, the propagation loss having been calculated based on information indicating the reception signal strengths in the relay station of uplink signals transmitted respectively by the one, two, or more second receiving stations and transmission power values respectively used by the one, two, or more second receiving stations to transmit the uplink signals; and the information processing apparatus assigns the second resource block to the second receiving station with the largest propagation loss, among the second receiving stations in which the propagation loss exceeds the threshold, as the resource block to be used for transmission at the same timing as the timing at which the relay station performs transmission using the first resource block.

16. The information processing apparatus according to claim 15, wherein the threshold is calculated using the maximum transmission power allowed by the relay station, respective noise levels of the one, two, or more second receiving stations, a value indicating a desired downlink quality between the transmitting station and each of the one, two, or more second receiving stations, and a margin.

17. A communication system comprising:

a relay station that non-regeneratively relays a signal from a transmitting station to a first receiving station; and an information processing apparatus that controls the non-regenerative relay, wherein the information processing apparatus executes:

in a case where the relay station performs the non-regenerative relay using a first resource block that is assigned to the relay station and the first receiving station for the non-regenerative relay and a second resource block that uses a baseband signal obtained by inverting frequencies of a baseband signal relating to the first resource block, determining, which is made based on information indicating a reception signal strength of a signal received by the relay station from a second receiving station other than the first receiving station, as to whether or not interference with the second receiving station is allowable; and assigning the second resource block to the relay station and the first receiving station as an additional resource block for the non-regenerative relay when determining that the interference is allowable.

18. The communication system according to claim 17, wherein the relay station:

receives, from the information processing apparatus, information indicating a timing for the second receiving station to transmit a signal using the second resource block, and an instruction to measure the reception signal strength in the relay station of the signal transmitted by the second receiving station at the timing; and transmits, to the information processing apparatus, information indicating the reception signal strength in the relay station of the signal transmitted by the second receiving station, the reception signal strength having been acquired by measurement in accordance with the measurement instruction.

19. The communication system according to claim 17, wherein the relay station:

receives, from the information processing apparatus, information indicating one, two, or more second receiving stations that are intending to transmit uplink signals at an identical timing to the timing at which the relay station transmits a signal using the first resource block, and information indicating resource blocks used respectively by the one, two, or more second receiving stations to transmit the uplink signals; and transmits, to the information processing apparatus, information indicating reception signal strengths in the relay station of the uplink signals transmitted by the one, two, or more second receiving stations, the reception signal strengths having been acquired by the relay station by measurement.

20. The communication system according to claim 17, wherein the relay station comprises:

an antenna;

a receiver that converts a signal from the transmitting station, received by the antenna, into a first baseband signal;

a baseband circuit that generates a second baseband signal relating to the second resource block by obtaining a complex conjugate of the first baseband signal; and a transmitter that converts a signal combining the first baseband signal and the second baseband signal into a wireless signal to be non-regeneratively relayed to the first receiving station.

* * * * *